United States Patent [19]

Kono

[11] 4,055,153
[45] Oct. 25, 1977

[54] FUEL SUPPLY SYSTEM FOR A ROTARY PISTON ENGINE

[75] Inventor: Toshiyuki Kono, Toyoake, Japan

[73] Assignee: Toyota Jidosha Kogyo Kabushiki Kaisha, Toyota, Japan

[21] Appl. No.: 631,391

[22] Filed: Nov. 12, 1975

[30] Foreign Application Priority Data

Aug. 15, 1975 Japan .................................. 50-99387

[51] Int. Cl.² ............................................. F02B 53/10
[52] U.S. Cl. .............................. 123/8.09; 123/119 LR
[58] Field of Search ..................... 123/8.09, 8.11, 8.13, 123/32 EA, 32 ST, 119 R, 198 F, 198 DB

[56] References Cited

U.S. PATENT DOCUMENTS

| 3,589,344 | 6/1971 | Steinke | 123/8.09 |
| 3,780,707 | 12/1973 | Cole | 123/8.45 X |
| 3,827,237 | 8/1974 | Linder et al. | 60/276 X |
| 3,898,963 | 8/1975 | Iwata et al. | 123/8.09 X |
| 3,910,240 | 10/1975 | Omori et al. | 60/285 X |
| 3,915,126 | 10/1975 | Kishimoto et al. | 123/8.13 |
| 3,982,393 | 9/1976 | Masaki et al. | 60/274 |

Primary Examiner—Carlton R. Croyle
Assistant Examiner—Michael Koczo, Jr.
Attorney, Agent, or Firm—Birch, Stewart, Kolasch and Birch

[57] ABSTRACT

In a stratified combustion rotary piston engine of the Wankel-type wherein individual combustion chambers are charged with a fuel-air mixture by a fuel-air mixture supply system and air by an air supply system, a fuel supply system incorporated in said fuel-air supply system being adapted to supply fuel in the injection manner by varying the amount of fuel to be injected for individual combustion chambers so that the overall air/fuel ratio is altered for the individual combustion chambers.

5 Claims, 3 Drawing Figures

FUEL SUPPLY SYSTEM FOR A ROTARY PISTON ENGINE

BACKGROUND OF THE INVENTION

1. Field of the Invention:

The present invention relates to a rotary piston engine and, more particularly, a method of and a device for supplying fuel to a stratified combustion rotary piston engine.

2. Description of the Prior Art:

In the so-called Wankel-type rotary piston engine which comprises a casing composed of a rotor housing having a trochoidal inner peripheral surface and side housings which close opposite sides of said rotor housing and a polygonal rotor adapted to rotate eccentrically in said casing with apex portions thereof sliding over said inner peripheral surface, the flame initiated from an ignition plug propagates very swiftly toward the leading side located at the front side of the rotor as seen in the rotational direction of the rotor due to the flow of fuel-air mixture caused by the rotation of the rotor. However, the propagation of the flame toward the trailing side located at the rotationally rear side of the rotor is relatively impeded, whereby there exists the problem that although the fuel-air mixture is favorably combusted in the leading side, the combustion is incomplete in the trailing side thereby lowering the combustion efficiency with the results of increasing the fuel consumption and simultaneously increasing the emission of harmful uncombusted components such as HC and CO in the exhaust gas. In order to solve this problem, I have proposed a rotary piston engine having a first intake port which opens in said trochoidal inner peripheral surface and a second intake port which opens in an inner surface of said side housing at a position advanced from said first intake port with respect to the rotational direction of the rotor. The first intake port is supplied with a fuel-air mixture while said second intake port is supplied with only air, thereby providing a stratified charging in a manner that the leading side portion of the combustion chamber where the combustion of the fuel-air mixture is relatively easily effected is filled with a relatively rich fuel-air mixture, whereas the trailing side of the chamber where the combustion of the fuel-air mixture is difficult to achieve is filled with only air.

In this stratified combustion rotary piston engine, the particular manner of combustion improves the fuel consumption when compared with the conventional rotary piston engine and, simultaneously, contributes to reducing the emission of HC and CO in the exhaust gas. However, since the emission of HC and CO is not completely reduced to zero, it is required that those components remaining in the exhaust gas are processed in a thermal reactor. Since it is required that temperature of the exhaust gas must be above a certain level if an effective operation of the thermal reactor is to be accomplished, the lowering of the exhaust gas temperature in the abovementioned stratified combustion causes the problem that the purifying performance of the thermal reactor is substantially lowered.

Furthermore, although the amount of NOx contained in the exhaust gas of the rotary piston engine is very small when compared with the reciprocating engines so that it meets the present-day regulations for emission control without any countermeasures being required, it is expected that the regulations regarding exhaust gas will become more severe in the near future and, therefore, the current rotary piston engine will soon violate the regulations with regard to NOx emission.

It is known that generally there exists a relation such as shown in FIG. 1 between the air/fuel ratio and the emission of HC, CO and NOx in the exhaust gas of a gasoline engine. In FIG. 1 the scales for CO, HC and NOx are particularly adapted for the case of the rotary piston engine. As apparent from FIG. 1, the NOx content in the exhaust gas is a maximum when the air/fuel ratio is about 15-16 but lowers relatively steeply as the air/fuel ratio increases or decreases from the abovementioned value. The present anti-air pollution rotary piston engine employs an air/fuel ratio of about 12-13, whereby the emission of NOx is restricted within an acceptable limit while the HC and CO delivered in this operational condition are eliminated by recombusting in a thermal reactor. However, if, for example, the limit value of 0.25 g/km for NOx, which is expected to be enforced in the near future, is to be satisfied, the NOx content must be lower than 130 ppm. To accomplish this, the air/fuel ratio must be either substantially low, that is, in the order of about 11-12 or, on the contrary, must be relatively high, that is, in the order of about 18-19. If the air/fuel ratio is lowered to the order of 11-12, the amount of HC and CO substantially increases beyond the limit which can be processed by the present thermal reactor or catalyst. On the other hand, if the air/fuel ratio is increased as high as about 18-19, the ignitability of fuel-air mixture becomes poor thereby causing misfiring and making it difficult to maintain a smooth operation of the engine. In this condition, the CO content is almost zero and, although the amount of HC relatively increases when compared with its minimum value, its absolute value is still acceptable and it is still possible to process the uncombusted components by the present thermal reactor or catalyst.

SUMMARY OF THE INVENTION

The present invention is based upon the consideration regarding the aforementioned relationship between the air/fuel ratio and the emission of HC, CO and NOx and contemplates providing an air-pollution free stratified combustion clean engine which can maintain a smooth operation while supressing the emission of NOx within the limit to satisfy the regulations, simultaneously suppressing the emission of HC and CO within the limit to be processed by a thermal reactor or catalyst while maintaining the temperature of the exhaust gas at a sufficiently high level required for the post processing by the thermal reactor or catalyst. Accordingly, the object of the present invention is to provide a novel system for supplying fuel to the air-pollution free, stratified combustion, clean engine based upon the aforementioned principle.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a device and method for supplying fuel to a rotary piston engine of the type comprising a casing composed of a rotor housing having a trochoidal inner peripheral surface and side housings which close opposite ends of said rotor housing, and a polygonal rotor adapted to rotate eccentrically in said casing with apex portions thereof sliding over said trochoidal surface while defining a plurality of combustion chambers between said trochoidal surface and individual flanks of said polygonal rotor. The casing has first and second intake ports which open in the inner wall of said casing, said second port being positioned as advanced in the rotational direction of said rotor relative to said first port, wherein the improvement comprises supplying fuel-air mixture through said first port while supplying only air through said second port, said supply of fuel and air being controlled so that the overall air/fuel ratio determined by the fuel-air mixture supplied through said first port and the air supplied through said second port is altered according to a predetermined order for said plurality of combustion chambers.

According to the abovementioned method, for example, a first combustion chamber which performs the suction stroke in the first of said order is supplied with a relatively rich fuel-air mixture having the air/fuel ratio in the order of 11-12 and a second combustion chamber which performs the suction stroke in the second of said order is supplied with a relatively lean fuel-air mixture having the air/fuel ratio in the order of 18-19, the subsequent combustion chambers being supplied with relatively rich or lean fuel-air mixtures, alternately in the same manner. Under this operating manner, the exhaust gas delivered from the rotary piston engine will show a low NOx value like below 130 ppm with respect to any combustion chamber operating with either the rich or the lean fuel-air mixture. As for the CO content, the exhaust from the combustion chamber which operates with a relatively rich fuel-air mixture will show about 7% emission of CO while the exhaust from the combustion chamber which operates with the relatively lean fuel-air mixture will show substantially zero emission of CO, thus resulting in the mean value of CO emission in the order of 3.5% which is lower than the 4% emission in the conventional operation with an air/fuel ratio of about 13, provided that the effect of the stratified combustion is omitted, said effect, however, acting favorably in reducing the content of CO, HC and NOx. With regard to HC, the emission will slightly increase. However, since the absolute value of HC is relatively low, the overall content of the uncombusted components resulting from HC and CO is still limited within the range which can be treated by the conventional thermal reactor. Furthermore, because a relatively high exhaust gas temperature is obtained in the rich combustion phase of the alternate combustion of the rich and the lean fuel-air mixtures, even when the overall air/fuel ratio is relatively high, recombustion of the uncombusted components in the thermal reactor is effected in a high efficiency.

In the combustion chamber supplied with the relatively lean fuel-air mixture of the air/fuel ratio in the order of 18-19, the probability of causing misfiring is relatively high due to poor ignitability of the lean fuel-air mixture. Therefore, if the rotation of the rotor is to be maintained only by such lean combustion, the operation of the engine will become unstable. However, since in the present invention the rotation of the rotor is assisted by the stable combustion effected in the combustion chambers supplied with the rich fuel-air mixture of the air/fuel ratio in the order of 11-12, the rotation of the rotor is stably maintained. Thus, the present invention accomplishes a reduction of NOx, the most difficult component to reduce, to the order of 130 ppm which is the limit expected to be enforced in the near future, while simultaneously supressing CO and HC within an acceptable limit and ensuring smooth and stable operation of the engine.

According to a particular feature of the present invention, the aforementioned periodical alteration of the overall air/fuel ratio may be effected by increasing or decreasing the amount of fuel contained in the fuel-air mixture supplied through said first intake port, i.e., by altering the air/fuel ratio of the fuel-air mixture supplied through said first intake port.

According to another particular feature of the present invention, said periodical alteration of the overall air/fuel ratio may be effected by increasing or decreasing the amount of air supplied through said second intake port while correspondingly decreasing or increasing the amount of air supplied as a fuel-air mixture through said first intake port, thereby altering the amount of fuel relative to the total amount of air supplied to the engine.

As a device for supplying fuel in the abovementioned manner to the rotary piston engine of the abovementioned type, the present invention proposes a device comprising a fuel air mixture supply system including a fuel injection means for supplying fuel-air mixture through said first port and an air supply system for supplying air through said second port, wherein the improvement comprises a control means for controlling said fuel injection means so as to generate relatively rich fuel-air mixture or relatively lean fuel-air mixture according to a predetermined order for said plurality of combustion chambers.

By supplying fuel in the injecting manner by employing the abovementioned fuel supply device, the amount of fuel supplied to individual combustion chambers can be controlled in a very high responsiveness by regulating the time for injecting fuel so that the amount of fuel is altered in a high precision for every combustion chamber which successively performs the suction stroke thereby effecting the abovementioned alternating combustion between the rich and lean fuel combustion.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
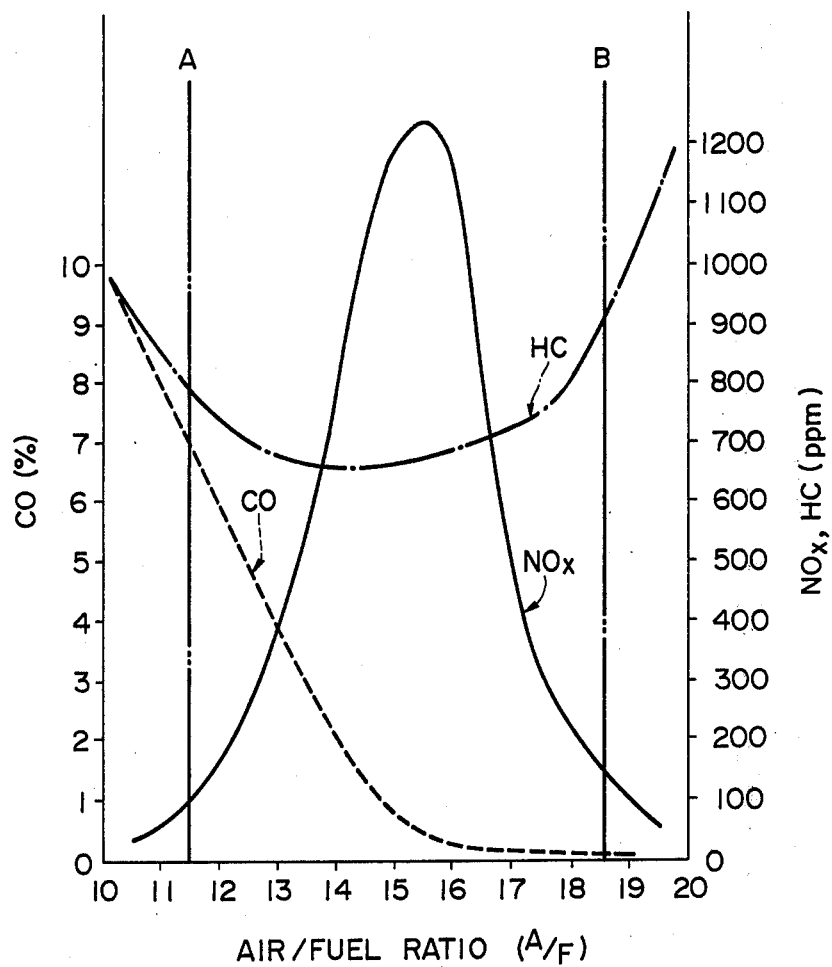
FIG. 1 is a graph showing the emission of CO, HC and NOx in the exhaust of a gasoline engine with respect to air/fuel ratio, the graph being particularly scaled for the case of a rotary piston engine.
Figure 2:
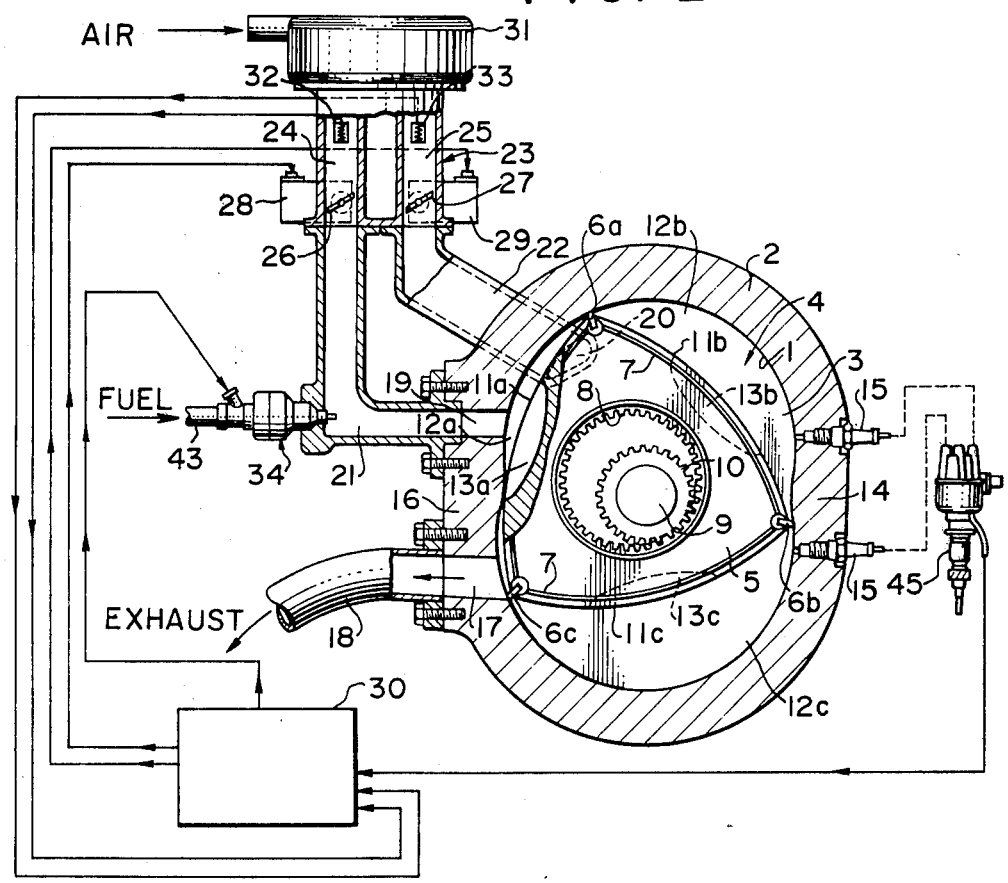
FIG. 2 is a diagrammatic view showing the basic constitution of the rotary piston engine incorporating the fuel supply system according to the present invention, and, FIG. 3 is a longitudinal section of an example of a fuel injection means employable in the present invention.

Referring to FIG. 2, a rotor housing 2 having a trochoidal inner peripheral surface 1 is assembled with side housings 4 each having a flat inside surface 3 to provide a casing, for housing a triangular rotor 5. The rotor is provided to be rotatable eccentrically around an eccentric shaft 9 with its apex seals 6a-6c provided at its three apex portions contacting said trochoidal surface. Side seals 7 are provided along three side edges and simultaneously contact said inner surface 3 of the side housing 5 under the meshing of an internal gear 8 thereof with a fixed gear 10 of the eccentric shaft 9. The rotor 5 in the casing defines three combustion chambers 12a-12c by its three arcuate peripheral flanks 11a-11c cooperating with said trochoidal inner peripheral surface. For the three combustion chambers, said three arcuate flanks 11a-11c provide recesses 13a-13c at a central portion thereof, respectively. Adjacent a short axis portion 14 of the trochoidal inner peripheral surface 1 of the rotor housing 2 are provided two ignition plugs 15, while adjacent another short axis portion 16, located rearward as seen in the rotational direction of the rotor, an exhaust port 17 is provided, said port being connected with an exhaust manifold 18. Adjacent the short axis portion 16, located forward as seen in the rotational direction of the rotor, a peripheral intake port 19 is provided and, as located further advanced therefrom in the rotational direction of the rotor, a side intake port 20 is provided to open in the side housing 4. In this case, the peripheral intake port 19 provides a relatively small constant opening area for a range of rotational angle of the eccentric shaft extending before and after of the top dead center while, in contrast, the side intake port 20 provides an opening area which varies in a manner to steeply increase after the rotational angle of the eccentric shaft has traversed the top dead center, then reaching its maximum which is several times larger that the opening area of the peripheral intake port about at the time when the peripheral intake port is closed and, thereafter, steeply decreasing toward zero.

The ports 19 and 20 are connected with first and second intake manifolds 21 and 22, respectively, these intake manifolds being connected at their inlet ends to a throttle body 23. The throttle body 23 is formed as a duplex throttle body having a first air supply passage 24 communicating with the intake manifold 21 and a second air supply passage 25 communicating with the intake manifold 22. The air supply passages 24 and 25 are provided with throttle valves 26 and 27, respectively, which are adapted to be driven independently from each other by individual actuators 28 and 29. The actuators may be an optional link mechanism adapted to be mechanically driven by an accelerating pedal or an electrical device employing a small electrical motor electrically controlled by a computer 30 according to the operation of an acceleration pedal. At the entrance of the throttle body 23 is mounted an air cleaner 31 and in the individual air passages 24 and 25 connected to the air cleaner are provided air flow sensors 32 and 33. These air flow sensors may be a well known heat wire sensor employing a thermal sensitive resistor element or a flapper sensor employing a flow sensitive flapper element adapted to despatch an electric signal according to the air flow detected thereby. The electric signals from these sensors are supplied to the computer 30.

Note, the electric computer 30 may, for example, be a slight modification of the electronic system disclosed in FIG. 7 of U.S. Pat. No. 3,827,237.

Figure 3:
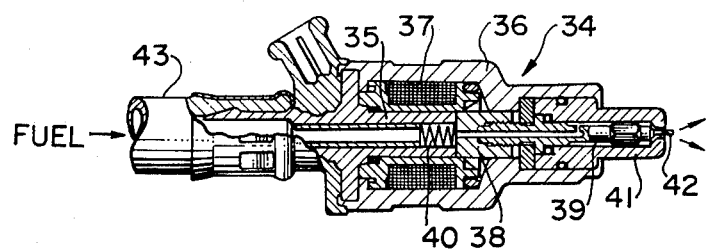

The first air supply passage 21 is provided with a fuel injection means 34 which injects fuel into the passage according to an injection signal supplied from the computer 30. The fuel injection means 34 may, for example, be an electro-magnetic fuel injection means as shown in FIG. 3. The fuel injection means shown in FIG. 3 comprises a body 35 and a solenoid casing 36 which encloses the body 35 while supporting therein a solenoid 37, said solenoid being adapted to draw a plunger 38 when it is energized by a driving pulse current supplied from the computer 30 thereby shifting a needle valve body 39 mounted to the plunger toward a valve opening position against the action of a compression coil spring 40, thus opening an injection opening 42 provided at a tip end of a nozzle casing 41 mounted at the tip end portion of the solenoid casing 36. A fuel supply tube 43 is connected to the rear end of the body 35 so that the fuel supplied through said fuel supply tube flows through a central bore formed in the body 35, the plunger 38 and a portion of the needle valve body 39 as shown by arrows in the figure to be ejected from the injection opening 42 toward the air supply passage 21. The amount of fuel injected in the abovementioned manner is regulated by the time in which the needle valve is opened, i.e., the time in which the solenoid 37 is energized, because the stroke of the needle valve is constant.

The computer 30 is supplied with a timing signal for indicating the time for making fuel injection from a distributor 45 which may be a conventional one equipped in the conventional rotary piston engine. The computer 30 sends the ignition signal to the fuel injection means 34 in the form of a combination of a relatively long pulse and a relatively short pulse arranged in a predetermined order as synchronized to the timing signal supplied from the distributor 45, wherein the pulse length is increased or decreased according to the total air flow detected by the air flow sensors 32 and 33. By this arrangement, supposing that, for example, the combustion chamber 12a initiates the performance of the suction stroke, the computer 30 sends a relatively long pulse ignition signal to the fuel injection means 34 depending upon the timing signal received from the distributor 45 thereby making the fuel injection means 34 inject fuel for a time corresponding to the pulse length of the relatively long pulse, thus supplying relatively rich fuel-air mixture to the combustion chamber 12a. When the rotor 5 has rotated so far that the next combustion chamber 12c initiates the performance of the suction stroke, the computer 30 sends the next relatively short pulse of the ignition signal to the fuel injection means 34 according to the timing signal received from the distributor 45, whereby the fuel injection means 34 makes injection of fuel for a short time corresponding to the relatively short pulse length thereby supplying a relatively lean fuel-air mixture to the combustion chamber 12c. In the further rotation of the rotor, for each combustion chamber which performs the suction stroke, the fuel injection means 34 injects fuel into the air supply passage 21 for a relatively long or short time according to the injection signal thereby supplying a relatively rich or lean fuel-air mixture to the individual combustion chambers, said fuel-air mixture forming the stratified charge in the individual combustion chambers together with the air supplied through the second air supply passage 22 and the side intake port 20.

The order in the repetition of charging the relatively rich and lean fuel-air mixtures need not be a strict alternation of one charge of each type but the sequence may be determined so that one charge of a relatively rich fuel-air mixture may be followed by two or three charges of a relatively lean fuel-air mixture.

Furthermore, although the present invention has been illustrated and described with reference to the embodiment having a peripheral intake port and a side intake port, the latter being positioned as advanced from the former as seen in the rotational direction of the rotor, the present invention is not limited to this structure and it is also applicable to the rotary piston engine which operates with two peripheral intake ports or two side intake ports.

I claim:

1. A rotary piston engine comprising a casing composed of a rotor housing having a trochoidal inner peripheral surface and side housings which close opposite ends of said rotor housing, a polygonal rotor adapted to rotate eccentrically in said casing with apex portions thereof sliding over said trochoidal surface thereby defining a plurality of combustion chambers between said trochoidal surface and individual flanks of said polygonal rotor, said casing having first and second intake ports which open in the inner wall of said casing, said second port being positioned so as to be advanced in the rotational direction of said rotor relative to said first port, first and second intake systems connected to said first and second ports, respectively, fuel injection means for injecting fuel into said first intake system, first and second means to detect intake air flow rate in said first and second intake systems and to despatch first and second flow rate signals showing the intake air flow rate in said first and second intake systems, respectively, means to detect the rotation of said rotor and to despatch a timing signal showing the rotational timing of said rotor, a computer which operates depending upon said first and second flow rate signals and said timing signal to produce a series of fuel injection signals for actuating said fuel injection means in a manner that the duration and timing of the fuel injection in said first intake system are determined by said flow rate signals and said timing signal, respectively, wherein said duration is cyclically altered for every sequential suction stroke performed by said plurality of combustion chambers so as to charge the individual combustion chambers with a relatively rich fuel-air mixture or a relatively lean fuel-air mixture.

2. The engine of claim 1, wherein said fuel injection means is of the electromagnetic type and is adapted to make the fuel injection while it receives an electric pulse, and said series of fuel injection signals are electric pulses.

3. The engine of claim 1, wherein said first and second means for despatching said first and second flow rate signals are air flow sensors provided in said first and second intake systems, respectively.

4. The engine of claim 1, wherein said means for despatching said timing signal is a distributor.

5. The engine of claim 1, wherein said computer controls said fuel injection means so that overall air/fuel ratio of individual combustion chambers is either about 11-12 or about 18-19.

* * * * *